US011451440B1

(12) United States Patent
Deshmukh et al.

(10) Patent No.: US 11,451,440 B1
(45) Date of Patent: Sep. 20, 2022

(54) SHARING CONFIGURATION RESOURCES FOR NETWORK DEVICES AMONG APPLICATIONS

(71) Applicant: Juniper Networks, Inc., Sunnyvale, CA (US)

(72) Inventors: Raviraj Satish Deshmukh, Pune (IN); Pradeep H. Krishnamurthy, Bangalore (IN); Varun S K, Shikaripur (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/448,339

(22) Filed: Sep. 21, 2021

(51) Int. Cl.

| H04L 41/0816 | (2022.01) |
|---|---|
| H04L 41/08 | (2022.01) |
| H04L 45/24 | (2022.01) |
| H04L 45/02 | (2022.01) |
| H04L 41/084 | (2022.01) |
| H04L 41/0859 | (2022.01) |
| H04L 41/0226 | (2022.01) |
| H04L 41/0873 | (2022.01) |

(52) U.S. Cl.
CPC ...... *H04L 41/0816* (2013.01); *H04L 41/0226* (2013.01); *H04L 41/0843* (2013.01); *H04L 41/0859* (2013.01); *H04L 41/0873* (2013.01); *H04L 41/0883* (2013.01); *H04L 45/02* (2013.01); *H04L 45/24* (2013.01)

(58) Field of Classification Search
CPC . H04L 41/0213–024; H04L 41/08–082; H04L 41/085–0873
See application file for complete search history.

(56) References Cited

U.S. PATENT DOCUMENTS

| 7,155,534 B1 * | 12/2006 | Meseck | H04L 41/0873 709/240 |
|---|---|---|---|
| 10,044,522 B1 * | 8/2018 | Shamis | H04L 12/44 |
| 10,200,248 B1 * | 2/2019 | Jiang | H04L 41/0879 |

(Continued)

OTHER PUBLICATIONS

Bjorklund, "YANG—A Data Modeling Language for the Network Configuration Protocol (NETCONF)," Internet Engineering Task Force (IETF), RFC 6020, Oct. 2010, 173 pp.

(Continued)

*Primary Examiner* — Brendan Y Higa
(74) *Attorney, Agent, or Firm* — Shumaker & Sieffert, P.A.

(57) ABSTRACT

In an example, a method includes receiving, by a network management system (NMS), a configuration request comprising first configuration data for a network device, the first configuration data defining a data structure comprising a first property/value pair; generating, by the NMS from the first configuration data, a corresponding first path/value pair for the first property/value pair, wherein a path of the first path/value pair uniquely identifies the first path/value pair in an associative data structure; modifying, by the NMS, the associative data structure based on the first path/value pair; generating, by the NMS, from the associative data structure, a configuration resource comprising second configuration data for the network device, the second configuration data comprising a second property/value pair that corresponds to the first path/value pair; and sending, by the NMS, the second configuration data to the network device to modify a configuration of the network device.

20 Claims, 7 Drawing Sheets

(56) References Cited

U.S. PATENT DOCUMENTS

| | | | | |
|---|---|---|---|---|
| 10,382,265 | B1* | 8/2019 | Anburose | H04L 61/2076 |
| 11,252,035 | B2* | 2/2022 | Wang | H04L 41/0886 |
| 2014/0280268 | A1* | 9/2014 | McKay | H04L 41/0893 |
| | | | | 707/758 |
| 2016/0337187 | A1* | 11/2016 | Gopalarathnam | H04L 49/351 |
| 2017/0187577 | A1* | 6/2017 | Nevrekar | H04L 41/0226 |
| 2020/0313957 | A1* | 10/2020 | A | H04L 41/0866 |
| 2020/0403863 | A1* | 12/2020 | A | G06F 16/9024 |
| 2022/0103427 | A1* | 3/2022 | Mallipudi | H04L 67/16 |

OTHER PUBLICATIONS

"API Overview", Kubernetes API, version 1.21, Feb. 22, 2021, 36 pp.

Lai, "Break Down Kubernetes Server-Side Apply", medium.com, Jan. 1, 2021, 13 pp.

"ManagedFields options are very verbose, making kubectl usage a bit", GitHub.com, Apr. 10, 2020, 16 pp.

Pelisse, "Kubernetes 1.18 Feature Server-side Apply Beta 2", Kubernetes Blog, Apr. 1, 2020, 2 pp.

"Server-Side Apply", Kubernetes, v.1.16 [beta], Jun. 8, 2021, 10 pp.

\* cited by examiner

SHARING CONFIGURATION RESOURCES FOR NETWORK DEVICES AMONG APPLICATIONS

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view configuration data and operations data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current configuration data and operating parameters, system logs, information related to network connectivity, network activity or other status information from the devices as well as view and react to event information received from the devices.

Network services may be performed by multiple distinct devices, such as routers with service cards and/or dedicated service devices. Such services include connectivity services such as Layer 3 Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

SUMMARY

In general, techniques are described for sharing configuration resources for a network device, among multiple applications seeking to modify a configuration of the network device, by associating (e.g., "tagging") properties of configuration resources with application identifiers for the applications. For example, a network management system may store data defining a configuration resource, which models a resource on a network device managed by the network management system. A configuration resource may be created, updated, and deleted using an interface to the network management system. Modifying a configuration resource in any of these ways triggers a corresponding modification, by the network management system, of the corresponding resource on the network device to change the operation of the network device. For example, deleting a configuration resource for a routing policy of a network device causes the network management system to delete the configuration data for that routing policy (i.e., the resource) from the network device.

The network management system may receive configuration requests from multiple different applications that involve the same resource of the same network device. The network management system may enable multiple applications to share the configuration resource for that resource on that network device by allowing the applications to each modify the configuration resource and, more particularly, the properties and respective property values (hereinafter, "property/value pairs") of that configuration resource. To reduce conflict among applications having different configuration intents for the corresponding resource of the network device, the network management system associates each property/value pair with application identifiers for the one or more applications that use the network management system to create or modify the property/value pair. The network management system may use the associations to process subsequent configuration requests for the configuration resource.

The techniques may provide one or more technical advantages that may realize at least one practical application. For example, the techniques may improve network device and network management system utilization and user experience in a multi-tenant and/or multi-administrator context by facilitating sharing while reducing conflicts. In the absence of these techniques, such conflicts could lead to inconsistent configuration of network devices and network instability. As another related example, the techniques may reduce and, in some cases, eliminate conflicts among multiple applications that are using a network management system to configure a resource of a network device. By associating each property/value pair that has been set for a configuration resource with one or more applications, the network management system may (1) allow multiple applications to configure different property/value pairs for the same configuration resource and may also (2) allow multiple application to configure the same property/value pair for the same configuration resource, so long as the requested values do not conflict. In addition, the techniques may allow different applications to start and stop the use of a configuration resource at different times.

In an example, a network management system includes a control unit comprising processing circuitry coupled to a memory, wherein the control unit is configured to: receive a configuration request comprising first configuration data for a network device, the first configuration data defining a data structure comprising a first property/value pair; generate, from the first configuration data, a corresponding first path/value pair for the first property/value pair, wherein a path of the first path/value pair uniquely identifies the first path/value pair in an associative data structure; modify the associative data structure based on the first path/value pair; generate, from the associative data structure, a configuration resource comprising second configuration data for the network device, the second configuration data comprising a second property/value pair that corresponds to the first path/value pair; and send the second configuration data to the network device to modify a configuration of the network device.

In an example, a method includes receiving, by a network management system, a configuration request comprising first configuration data for a network device, the first configuration data defining a data structure comprising a first property/value pair; generating, by the network management system from the first configuration data, a corresponding first path/value pair for the first property/value pair, wherein a path of the first path/value pair uniquely identifies the first path/value pair in an associative data structure; modifying, by the network management system, the associative data structure based on the first path/value pair; generating, by the network management system, from the associative data structure, a configuration resource comprising second configuration data for the network device, the second configuration data comprising a second property/value pair that corresponds to the first path/value pair; and sending, by the network management system, the second configuration data to the network device to modify a configuration of the network device.

In an example, a non-transitory computer-readable medium comprising instructions for causing processing circuitry of a network management system to perform operations comprising: receiving a configuration request comprising first configuration data for a network device, the first configuration data defining a data structure comprising a first property/value pair; generating, from the first configuration data, a corresponding first path/value pair for the first property/value pair, wherein a path of the first path/value pair uniquely identifies the first path/value pair in an associative data structure; modifying the associative data structure based on the first path/value pair; generating, from the associative data structure, a configuration resource comprising second configuration data for the network device, the second configuration data comprising a second property/value pair that corresponds to the first path/value pair; and sending the second configuration data to the network device to modify a configuration of the network device.

The details of one or more examples are set forth in the accompanying drawings and the description below. Other features, objects, and advantages of the disclosure will be apparent from the description and drawings, and from the claims.

BRIEF DESCRIPTION OF DRAWINGS

Like reference characters denote like elements throughout the figures and text.

DETAILED DESCRIPTION

Figure 1:
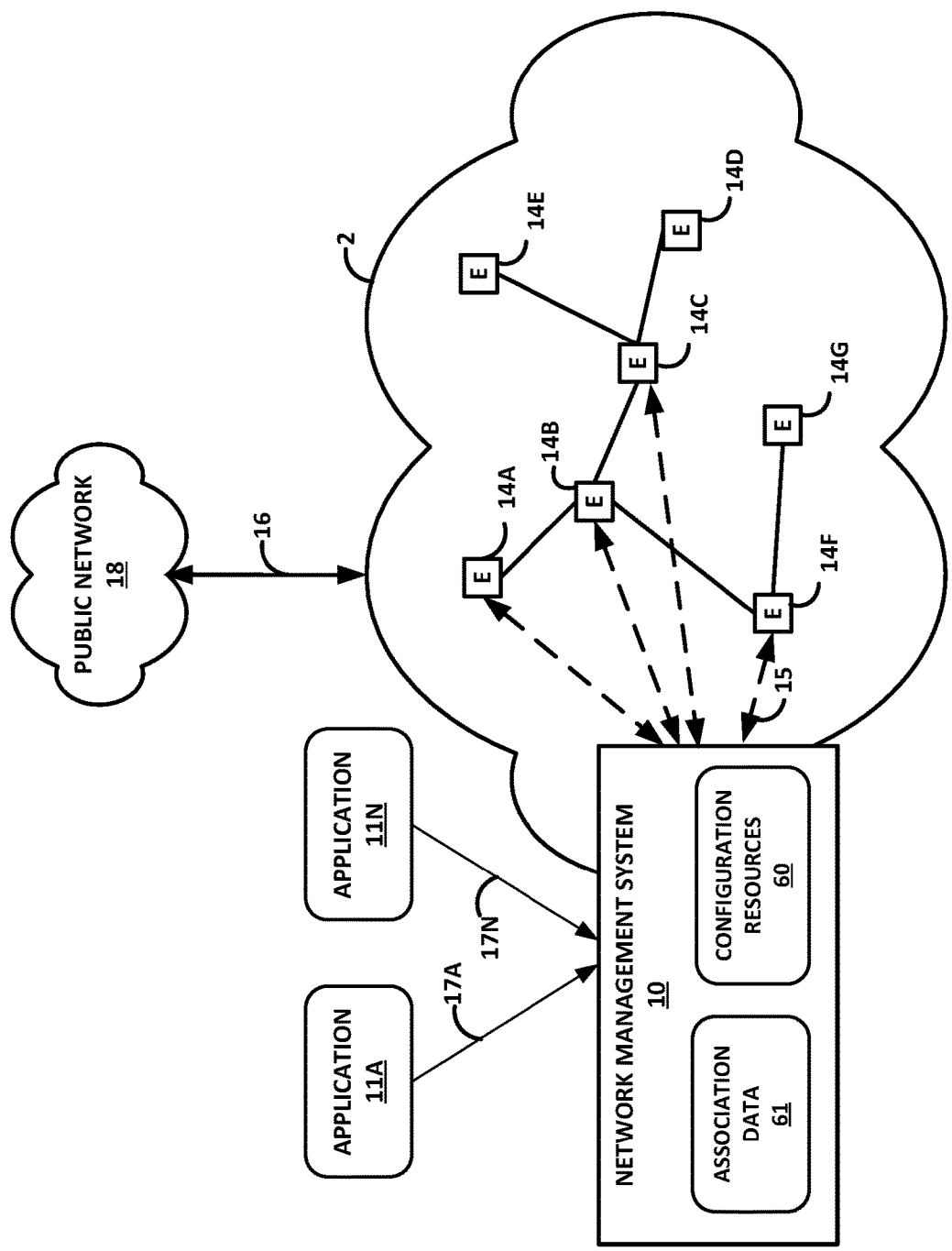
FIG. 1 is a block diagram illustrating an example including network devices managed using a network management system, in accordance with one or more techniques of this disclosure.

FIG. 1 is a block diagram illustrating an example including network devices of network 2 that are managed using a network management system 10, in accordance with one or more techniques of this disclosure. Network devices 14A-14G (collectively, "network devices 14") of network 2 include network devices interconnected via communication links to form a communication topology to exchange packetized data. Network devices 14 (also referred to herein as "elements" or "managed network devices") may include, for example, routers, switches, gateways, bridges, hubs, edge devices, software defined networking wide area network (SD-WAN) devices, firewalls or other intrusion detection systems (IDS) or intrusion prevention systems (IDP), other network devices, or a combination of such network devices. Communication links interconnecting network devices 14 may be physical links (e.g., optical, copper, and the like), wireless, or any combination thereof.

Network 2 is shown coupled to public network 18 (e.g., the Internet) via communication link 16. Public network 18 may include, for example, one or more client computing devices. Public network 18 may provide access to web servers, application servers, public databases, media servers, end-user devices, and other types of network resource devices and content. Although network 2 is primarily described herein with respect to an enterprise network, the techniques of this disclosure are applicable to other networks, public or private, such as Internet Service Provider (ISP) or Network Service Provider (NSP) networks, cloud service provider networks, and so forth. Network 2 may also be referred to herein as a "managed network" in that it is managed at least in part by applications 11A-11N (collectively, "applications 11") using network management system 10.

Network management system 10 may be a network appliance, one or more applications executing on one or more real or virtual servers, or a combination thereof. In various examples, network management system 10 may be deployed within network 2, at a management site for network 2, a branch office, within a public or private cloud, or some combination thereof. Network management system 10 may be vendor-specific, i.e., developed specifically for managing some or all of network devices 14 that have been manufactured by a particular vendor. Network management system 10 may not be vendor-specific, however, and have the capability to configure devices from multiple different vendors, e.g., using standardized device management protocols. Network management system 10 may include or represent an element management system (EMS) or device management system (DMS).

Network management system 10 communicates over a network, optionally including network 2, to manage network devices 14. Network management system 10 may establish respective persistent or non-persistent communication sessions with one or more of network devices 14 for configuration and monitoring. Once network devices 14 are deployed and activated, an administrator (not shown) and/or applications 11 may interface with network management system 10 in order to manage the network devices 14 via network management system 10. That is, rather than directly interfacing with network devices 14 using, e.g., a network device command line interface (CLI) or device management protocols executed by applications 11, applications 11 use network management system 10. This allows operators to centralize control and monitoring of the network devices 14 within network management system 10. In addition, network management system 10 may provide high-level services that translate high-level intents of the applications 11 and operators to low-level network device configurations.

Each of applications 11 represent executing instances of one or more applications. Each of applications 11 may be executed by a real or virtual server or by an appliance. Each of applications 11 may be deployed at a management site for network 2, a branch office, within a public or private cloud, or some combination thereof. Applications 11 may include an orchestration platform such as an Openstack, Kubernetes, or other orchestration platform; a network controller or software-defined networking (SDN) controller; a network director or network provisioning platform; a network services provisioning platform; operations/business support system (OSS/BSS); another network management system other than NMS 10; or any other application or system that may invoke NMS 10 to configure any of network devices 14.

To manage network system 2 including network devices 14, applications 11 may interface with network management system 10 to remotely monitor and configure network devices 14. For example, applications 11 may receive alerts from network management system 10 regarding any of network devices 14, view configuration data of network devices 14, modify the configuration data of network devices 14, add new network devices to network 2, remove existing network devices from network 2, or otherwise manipulate the network 2 and network devices therein.

Any of applications 11 may send configuration requests, e.g., configuration requests 17A-17N, to network management system 10 to cause network management system 10 to configure network devices 14 to specify certain operational characteristics that further the objectives of the application. For example, application 11A may specify for a network device 14A a particular operational policy regarding security, device accessibility, traffic engineering, quality of service (QoS), network address translation (NAT), packet filtering, packet forwarding, rate limiting, or other policies. If necessary, network management system 10 translates this operational policy included in a configuration request to configuration data for the network device 14A. Network management system 10 uses one or more device management protocols designed for management of configuration data within managed network devices 14, such as the SNMP protocol, Network Configuration Protocol (NETCONF) protocol, a generic remote procedure call (gRPC) network management interface (gNMI), or similar interface/protocol thereof to perform the configuration. In general, NETCONF provides mechanisms for configuring network devices and may use an Extensible Markup Language (XML)-based data encoding for configuration data.

In some examples, network management system 10 includes a management interface. The management interface of network management system 10 may be configured to accept configuration request in the form of high-level configuration data, or intents, from applications 11 (which may be expressed as structured input parameters, e.g., according to the Yet Another Next Generation (YANG) language, which is described in Bjorklund, "YANG—A Data Modeling Language for the Network Configuration Protocol (NETCONF)," Internet Engineering Task Force, RFC 6020, October 2010, available at tools.ietf.org/html/rfc6020), which is incorporated herein by reference in its entirety. The management interface of network management system 10 may also be configured to output respective sets of low-level device configuration data, e.g., device configuration additions, modifications, and removals.

In some examples, network management system 10 may use YANG modeling for an intent data model and low-level device configuration models. This data may contain relations across YANG entities, such as list items and containers.

In some examples, network management system 10 may convert a YANG data model into a database model, and convert YANG validations into data validations. Network management system 10 may receive data from applications 11 representing any or all of create, update, and/or delete actions with respect to the intent data model.

In accordance with techniques of this disclosure, network management system 10 includes configuration resources 60 for network devices 14. Data stored by or otherwise accessible to NMS 10 define each of configuration resources 60. Each of configuration resources 60 model a resource on one of network devices 14. As used herein, a resource of a network device is an instance of a data structure that, when configured with appropriate structure, properties, and values and stored to the network device, affects at least one operation of the network device. A resource is configuration data for the network device. A resource may correspond directly to a hardware resource, such as a hardware interface, or may more broadly affect the operation of the network device by configuring a service, policies, or other functions of the network device. Example resources of network devices 14 include interfaces, sub-interfaces, network instances such as SD-WANs or virtual private networks, routing instances, zones, routing policies, firewall policies, routing and other protocols, classes of service, accounting, chassis, security, system resources, and others. These various types of resources for network devices 14 may correspond to different types of configuration resources 60 that model such resources of network devices 14 within the network management system 10. Network management system 10 may store configuration resources 60 for multiple network devices 14.

Any of applications 11 may send configuration requests to NMS 10 to create, update, or delete configuration resources 60. Modification to a configuration resource in any of the above ways triggers a corresponding modification, by network management system 10, of the resource on a network device to modify the operation of the network device. For example, deleting one of configuration resources 60 corresponding to a routing policy of network device 14A causes network management system 10 to delete the configuration data for that routing policy (i.e., delete the resource) from network device 14A, and network device 14A will no longer operate according to the deleted routing policy.

Network management system 10 may receive multiple configuration requests from different applications 11, the multiple configuration requests involving the same resource of any of network devices 14. For example, application 11A and application 11N may send respective configuration requests 17A, 17N to network management system 10 to attempt to configure a configuration resource corresponding to a particular resource of network device 14A, e.g., a resource that configures an interface or routing policy of the network device.

Network management system 10 may arbitrate configuration access to configuration resources 60 among multiple applications 11. For example, network management system 10 may share any of configuration resources 60 by allowing multiple applications 11 to edit a configuration resource for a network device and, more particularly, the properties and respective property values (hereinafter, "property/value pairs") of that configuration resource. To reduce conflict among applications 11 having different configuration intents for the corresponding resource of the network device, network management system 10 associates each property/value pair with the one or more applications 11 interfacing with network management system 10 to create, update, or delete the property/value pair. Network management system 10 may use the associations to process subsequent configuration requests, received from any of applications 11, that specify the configuration resource. As described above, creating, updating, or deleting a property/value pair of a configuration resource causes NMS 10 to interface to the appropriate one of network devices 14 to create, update, or delete the corresponding resource, thereby reconfiguring the network device.

In the example of FIG. 1, to associate a path/value pair of a configuration resource with an application, network management system 10 may store association data 61. Association data 61 may include an associative data structure, such as a table, list, dictionary, or map, having one or more entries. Each entry may associate a unique path/value pair for one of configuration resources 60 with one or more application identifiers for respective applications 11 that have sent a configuration request to NMS 10 to configure a corresponding property/value pair in the configuration resource. The application identifiers may be referred to as "tags" in that an application identifier can be used to effectively tag, in association data 61, a path/value pair with the corresponding one of applications 11.

The techniques may provide one or more technical advantages that may realize at least one practical application. For example, the techniques may improve network devices 14 and network management system 10 utilization and user experience in a multi-tenant and/or multi-administrator context by facilitating sharing while reducing conflicts, which can lead to inconsistent configuration of network devices 14 and network 2 instability. As another related example, the techniques may reduce and, in some cases, eliminate conflicts among multiple applications 11 that are using a network management system 10 to configure a resource of any of network devices 14. By associating each property/value pair that has been set for a configuration resource with one or more applications 11, network management system 10 may (1) allow multiple applications 11 to configure different property/value pairs for the same one of configuration resources 60 and may also (2) allow multiple application 11 to configure the same property/value pair for the same configuration resource, so long as the requested values do not conflict. In addition, the techniques may allow different applications 11 to start and stop the use of any of configuration resources at different times.

Figure 2:
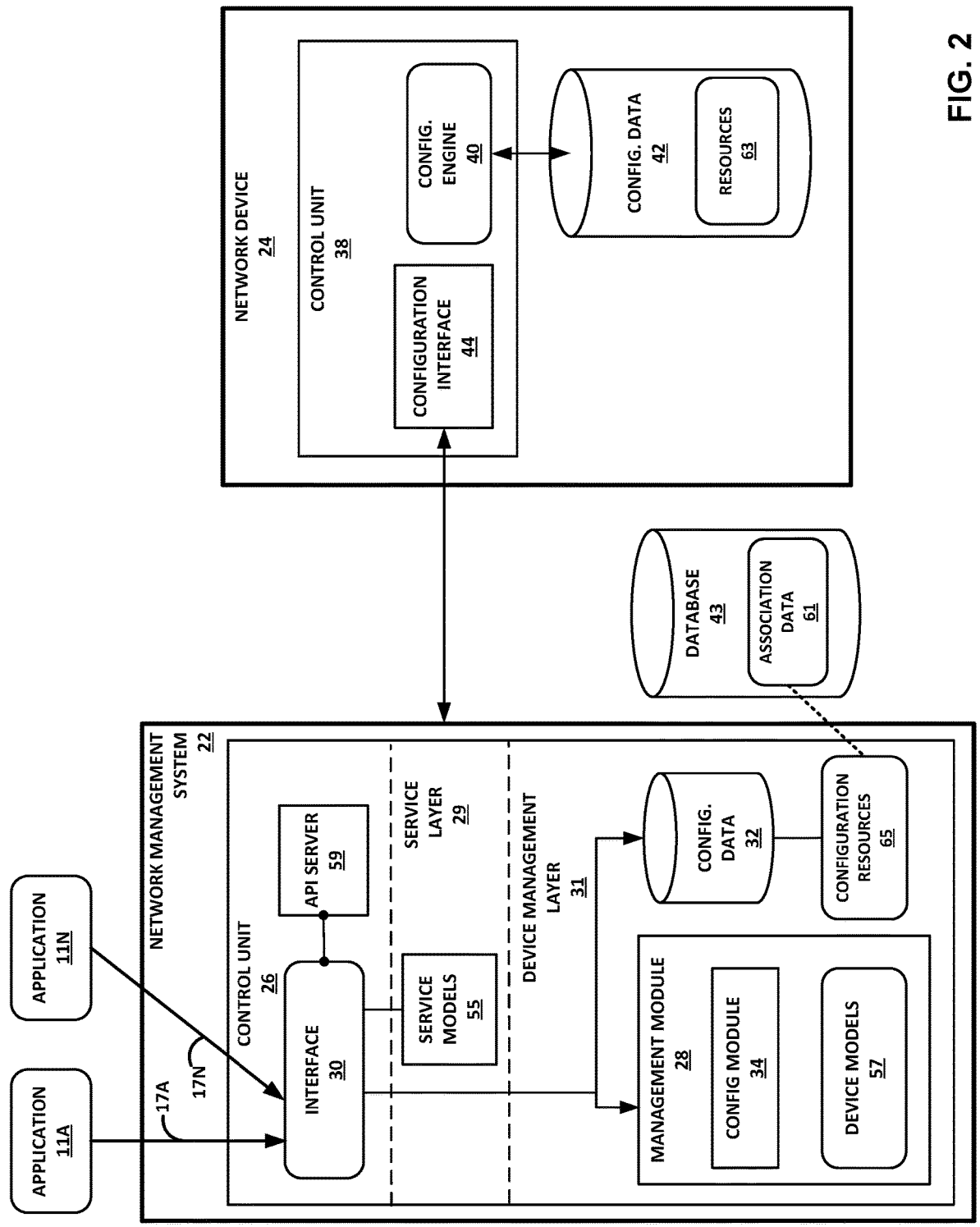
FIG. 2 is a block diagram illustrating an example network management system and network device, in accordance with techniques of this disclosure.

FIG. 2 is a block diagram illustrating an example network management system and network device, in accordance with techniques of this disclosure. Network management system 22 manages network device 24 using a management protocol, such as NETCONF, for exchanging management protocol messages over a communication link. While described with respect to one particular protocol for managing network devices, e.g., NETCONF, techniques of this disclosure may apply to any network management protocol that provides mechanisms to create, update, and delete the configuration data of network devices.

Network management system 22 may be an example of a network management system 10 of FIG. 1 and managed network device 24 may be an example of any of network devices 14 of FIG. 1. In the example illustrated in FIG. 2, network management system 22 includes control unit 26 and network device 24 includes configuration interface 44 and control unit 38. Each of network management system 22 and network device 24 may also include network interface cards (not shown).

Each of control unit 26 and control unit 38 may include processing circuitry that execute software instructions, such as those used to define a software or computer program, stored to a computer-readable storage medium, such as a storage device (e.g., a disk drive, or an optical drive), or memory (such as Flash memory, random access memory or RAM) or any other type of volatile or non-volatile memory, that stores instructions to cause processing circuitry to perform the techniques described herein. Alternatively or additionally, control unit 26 and/or control unit 38 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 26 provides an operating environment for interface 30, service layer 29, and device management layer 31. Generally, service layer 29 may be responsible for generating the request in accordance with service models 55 and passing the request to management module 28 within device management layer 31. Further, device management layer 31 may be responsible for constructing a configuration change request in accordance with device models 57. As shown, service layer 29 includes service models 55. Device management layer 31 includes management module 28 and configuration data (CONFIG. DATA) 32.

Interface 30 may be provided by an API server 59 executed by control unit 26. Interface 30 may be a Representational State Transfer (REST) interface that allows applications to issue configuration requests as remote procedure calls (RPCs). Interface 30 may be configured to receive configuration data in configuration requests in eXtensible Markup Language (XML), JSON, or plain text formats, for example.

Service models 55 may include an application-level model (e.g., Yet Another Next Generation model or simply "YANG model") that may be used to model configuration and state data manipulated by the NETCONF, NETCONF remote procedure calls, and NETCONF notifications. For example, service models 55 may receive, via interface 30 in a configuration request from an application, an application-level configuration for network device 24. In this example, the application-level configuration may be in accordance with the YANG model. Service models 55 may translate the application-level configuration from the YANG model into configuration changes for device models 57.

In some examples, management module 28 may receive, via interface 30, a configuration request 17 from an application 11 that includes the desired configuration for a resource of network device 24. The desired configuration may be in the form an object notation, such as JavaScript Object Notation (JSON). Applications 11 may be modified to use interface 30.

A configuration request may also indicate an application identifier for the application that issued the configuration request. An application identifier may be a unique identifier (e.g., a UUID), an application name, or other identifier.

Management module 28 represents an exemplary instance of a management application or, more generally, a network management application. Management module 28 is one example of a network management module. In one example, management module 28 provides mechanisms to install, manipulate, and delete the configuration of network devices of network device 24. Device models 57 may include a low level or device level data model (e.g., OpenConfig) that may be used to model configuration change requests. Configuration module 34 may be configured to send and/or commit configuration data to network device 24.

Network device 24 may be any device having one or more processors and a memory, and that is capable of executing one or more software processes, including configuration engine 40, that operates in accordance with a network management protocol, such as NETCONF. Network device 24 stores an "operating" or "running" configuration for the network device in configuration data (CONFIG DATA) 42. That is, configuration data 42 determines the operations of network device 24 with respect to, e.g., packet forwarding and other services provided by network device 24. Control unit 38 of device 24 provides an operating environment for configuration engine 40 and configuration data 42. Configuration data 42 may be stored in a data repository and may each store data in the form of one or more tables, databases, linked lists, radix trees, or other suitable data structure. Configuration data 42 may be local or remote to network device 24.

Applications issue configuration requests to interface 30 to direct management module 28 to manage network device 24 in a specified manner, e.g., to modify the configuration of device 24. In accordance with techniques of this disclosure, configuration requests may indicate a configuration resource in order to create, update, or delete a corresponding one or configuration resources 65. A configuration request may invoke an API method and/or endpoint of interface 30. A configuration request may specify a particular network device, e.g., network device 14B, to be configured according to the type of configuration operation (e.g., create, update, or delete) and any configuration data included.

For example, the applications may issue configuration requests that cause NMS 22 to modify configuration resources 65 that include portions of configuration data 32 and ultimately cause NMS 22 to deploy the modified configuration data 32, via configuration interface 44 and configuration engine 40, to configuration data 42 as a running configuration of network device 24. Each configuration resource 65 may be associated with a particular network device that is to be configured with the corresponding resource, e.g., network device 24 to be configured with one of resources 63. Configuration engine 40 may, for example, ensure consistency of configuration data 42, handle configuration commits, and other operations with respect to configuration data 42. Configuration data 42 includes resources 63. The term "resources" is defined above.

Configuration interface 44 may be provided by an API server executed by control unit 38. Configuration interface 44 may be a REST interface that allows network management system 22 to send configuration data to network device 24 in XML, JSON, or plain text formats, for example. Configuration interface 44 may execute one more network management protocols, e.g., NETCONF or SNMP, to receive configuration data, including resources, from network management system 22. Configuration engine 40 may commit received configuration data, including resources, to configuration data 42.

In accordance with techniques of this disclosure, network management system 22 stores, creates, updates, and deletes configuration resources 65 for corresponding resources 63 of network device 24. Configuration resources 65 may be example instances of configuration resources 60 of FIG. 1. Configuration resources 65 may be stored as part of configuration data 32 or separately from configuration data 32. A configuration resource is the cumulative configuration created by all applications that have issued configuration requests for the configuration resource, which configuration resource is for configuring the corresponding one of resources 63 on network device 24.

Figure 5:
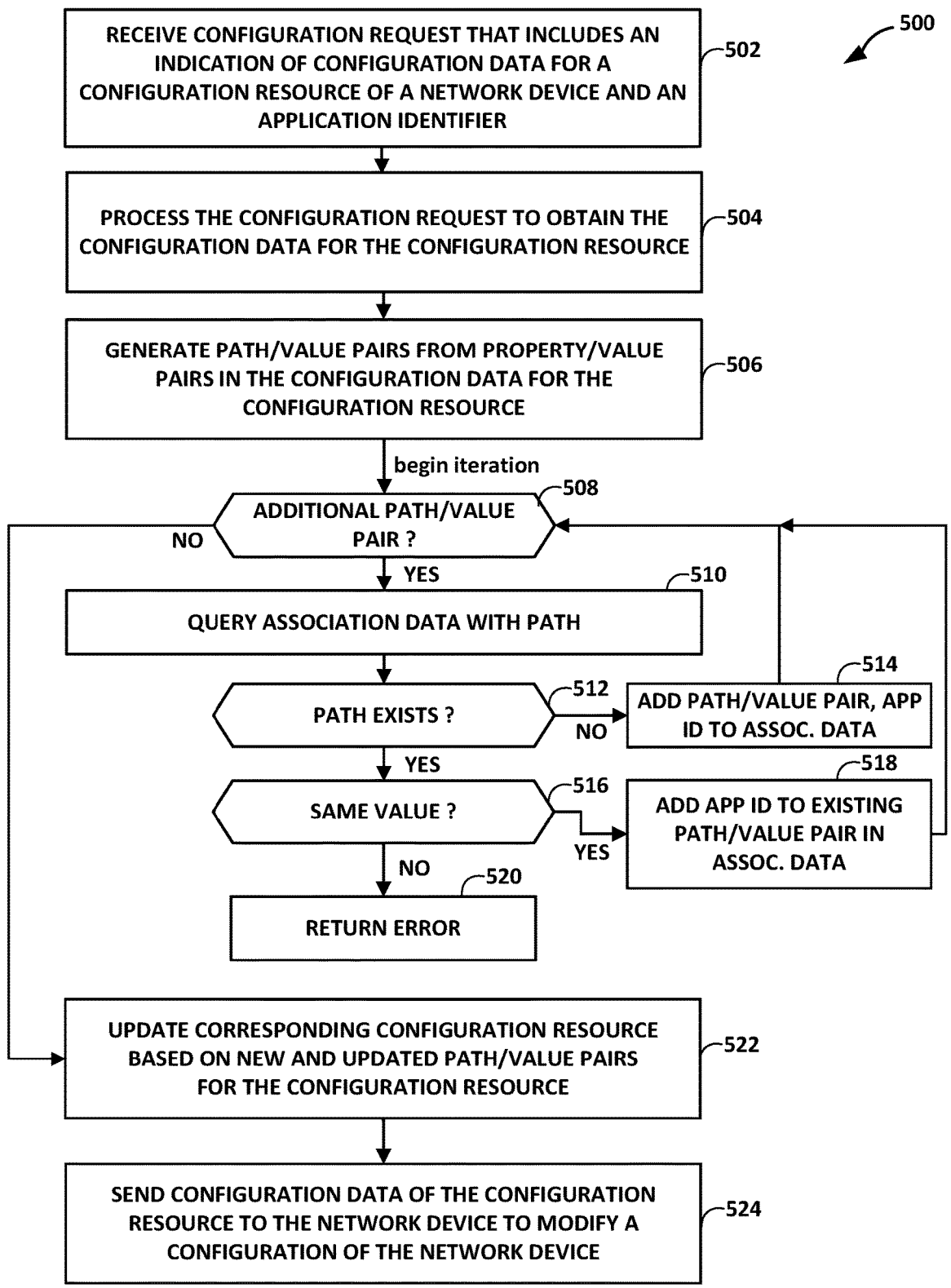
FIG. 5 is a flowchart illustrating an example process performed by a network management system to process a configuration request, in accordance with techniques of this disclosure.

Management module 28 processes configuration requests received at interface 30 and issued by multiple different applications. FIG. 5 is a flowchart illustrating an example process 500 performed by a network management system to process a configuration request, in accordance with techniques of this disclosure. Process 500 is described with respect to NMS 22 of FIG. 2, configuring network device 24, but may performed by other NMSes or other systems (e.g., EMSes, DMSes) to configure other examples of network devices described herein.

Figure 3:
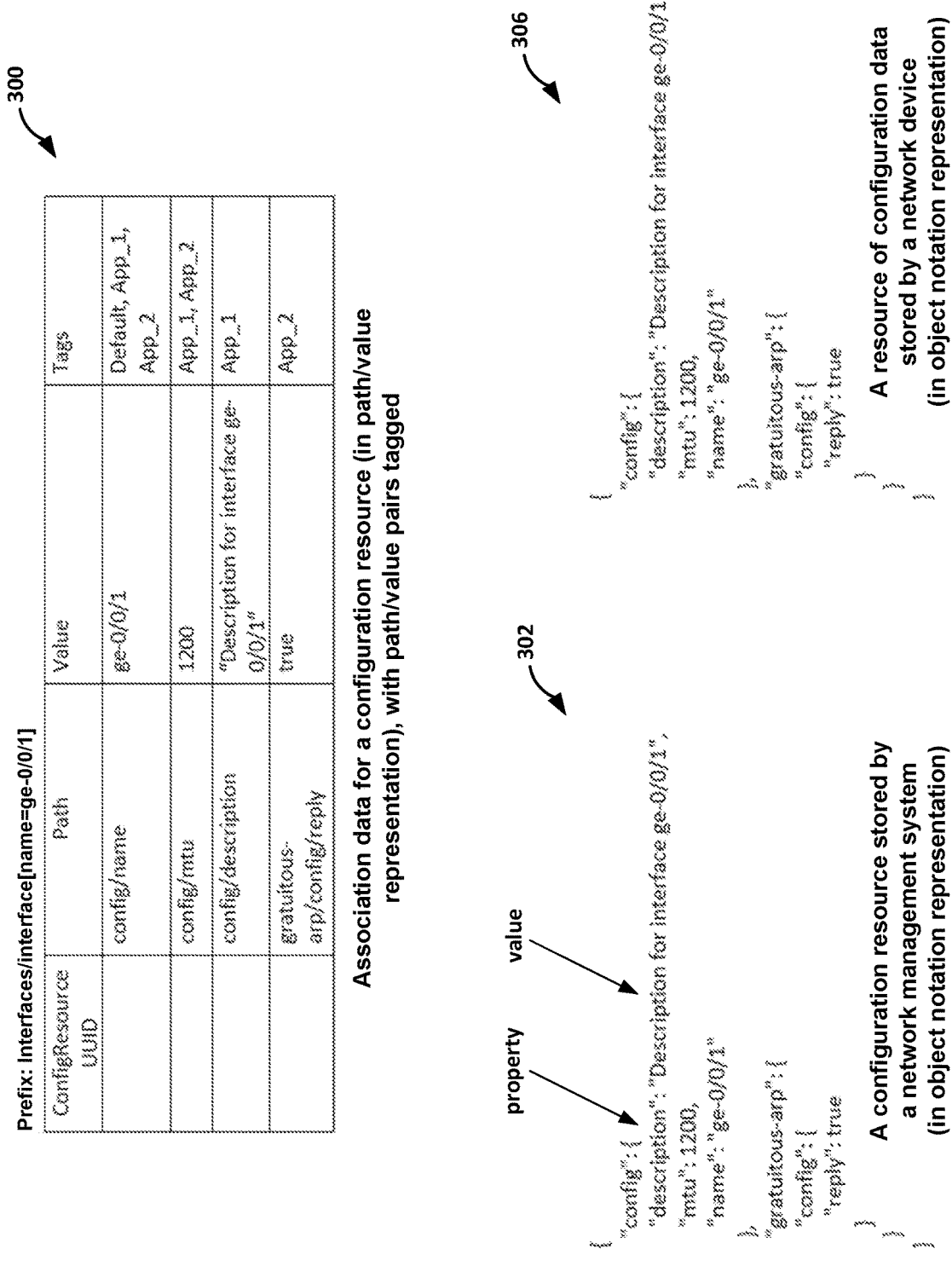
FIG. 3 depicts configuration data in various representations, in accordance with techniques of this disclosure.

Each configuration request indicates configuration data for a configuration resource of configuration resources 65 and includes an indication of an application that issued the configuration request. The indication may be an application identifier for the application. In response to receiving a configuration request that includes an indication of configuration data for a configuration resource of network device 24, and also include an application identifier for the application that issued the configuration request (502), management module 28 processes the configuration request to obtain configuration data for the configuration resource (504). In some cases, the configuration data for the configuration resource is included within the configuration request as JSON, XML, or other structured configuration data. In some cases, the configuration data for the configuration resource must be generated from indications in the configuration request. An example of configuration data for a configuration resource is shown in FIG. 3 as configuration data of configuration resource 302. The configuration data may include syntax that defines a structure for the configuration resource.

An example of data that may be included in a configuration request is as follows and includes configuration data ("ConfigurationData"), an application identifier ("Application-ID"), a device identifier ("Device-ID"), and a prefix ("Prefix") for identifying a particular resource of the device identified by device identifier:

```
Application-ID: App _2
Device-ID: <unique-device-identifier>
Prefix: Interfaces/Interface[name=ge-0/0/1]
ConfigurationData: {
    "config": {
        "mtu": 1200,
        "name": "ge-0/0/1"
    },
    "gratuitous-arp": {
        "config": {
            "reply": true
        }
    }
}
```

In the above example, the "Prefix" can be considered as a resource-name or resource-id which will uniquely identify the resource in the context of one device. If the prefix is not specified, ConfigurationData should contain the full configuration starting from root of configuration hierarchy. Another example of data that may be included in a configuration request is as follows and does not include a value for Prefix:

```
Application-ID: App_2
Device-ID: <unique-device-identifier>
Prefix: <empty>
```

```
ConfigurationData: {
    "interfaces": {
        "interface": [
            {
                "name": "ge-0/0/1",
                "config": {
                    "mtu": 1200,
                    "name": "ge-0/0/1"
                },
                "gratuitous-arp": {
                    "config": {
                        "reply": true
                    }
                }
            }
        ]
    }
}
```

The property/value pairs of configuration data may be arranged according to a hierarchy. For example, the configuration data may include syntax that defines one or more property/value pairs for the configuration resource. The syntax may structure the property/value pairs within a hierarchical data structure, such as a tree, a set of containers, another data structure, or a combination thereof. In the example of configuration data of configuration resource 302, for instance, this configuration data for an interface configuration resource includes a list of containers defined by braces: a "config" container defined that includes three property/value pairs (properties "description", "mtu", and "name"), and a "gratuitous-arp" container that itself include a different "config" container having one property/value pair (property "reply"). This configuration data thus conforms to a tree structure with hierarchical paths.

Management module 28 generates path/value pairs from property/value pairs in the configuration data obtained from the configuration request (506). For example, having obtained the configuration data for the configuration resource, management module 28 "flattens out" the configuration data such that each property/value pair has a separate path/value pair, the path being generated in part from the structure of the configuration data. In the example of FIG. 3, the configuration data of configuration resource 302 is flattened out as shown in the path/value pairs of association data of table 300 for configuration resource 302, in particular the Path column and the Value column. Table 300 may represent or be included in association data 61. In some cases, the Tags column will not be part of table and will be stored separately, using a tagging feature, which may be implemented as a separate library or module, and may be implemented as part of an API server. In some cases, the corresponding configuration resource will have the Prefix associated with it in order to shorten the length of paths that need to be stored to table 300 (or other forms of association data 61). This prefix will uniquely identify configuration resource for that device.

Management module 28 may use various path encoding conventions for generating paths for path/value pairs. For example, management module 28 may use gNMI path encoding to convert structured configuration data (e.g., XML or JSON) to a structured path.

Again referencing configuration data of configuration resource 302 as an example, management module 28 may apply path encoding to walk the structure to generate the paths by obtaining prefix strings ("prefixes") for each property/value pair. The "config" container (or node) becomes a prefix for all properties within the container. The names of these properties are appended to the prefix. Thus, the property "name" in the "config" container has partial path "config/name" and value "ge-0/0/1". A higher-layer prefix may be prepended for each path in path/value pairs. This prefix may be based on an identifier for the configuration resource to unique identify each path/value record within a set of path/value records for any configuration resources 65 that are stored for network device 24 (as well as other network devices, in some instances). In the path/value pairs of association data of table 300, the prefix is "Interfaces/interface[name=ge/0/0/1]". (This prefix has been broken out from the Paths column to improve readability). The configuration resource being configured is an Interface type, and the interface has a unique name among configuration resources having the Interface type. Thus, the full paths for properties "config/name" and "gratuitous-arp/config/reply" are "Interfaces/interface[name=ge/0/0/1]/config/name" and "Interfaces/interface[name=ge/0/0/1]/gratuitous-arp/config/reply", respectively. Similar conventions may apply for other resource types. Any even higher-layer prefix for paths may be a device identifier for network device 24 having the corresponding resources 63 for configuration resources 65. Management module 28 may use other schemes for ensuring uniqueness among paths for each property of configuration resource 63.

Thus, a configuration request can also include an optional "prefix" that will uniquely identify the resource in the configuration data model of a particular device. The configuration request can include prefix; however, the prefix can also be computed as described above.

In some examples, the prefix is a gNMI path that will uniquely identify the resource in the configuration data model. The configuration data model may be any hierarchical data model representing a device configuration. For example, with OpenConfig data model to represent the device configuration, following prefixes can uniquely identify the resources in the configuration hierarchy:

interfaces/interface[name=ge-0/0/0]—This will identify the instance of interface configuration resource with the name 'ge-0/0/0' and any other interface configuration that falls within/root/interfaces/interface hierarchy.

network-instances/network-instance[name=sdwan]—This will uniquely identify the network instance with the name 'sdwan'

The example configuration data model below has been annotated with square brackets to denote optional prefix locations in the model for identifying configuration resources. The square bracket may include a comma separated list of <key, value> pairs if the configuration resource at that location in the configuration data model is a collection. The key will be name of key element of collection and the value will be its value. Multiple <key, value> pairs can be present if a collection has a composite key.

```
+--root
    +--rw interfaces
        +--rw interface* [name]
            +--rw name
            +--rw config
            | +--rw name?
            | +--rw type
            | +--rw mtu?
```

```
      +--rw:gratuitous-arp
      | +--rw:config
      | | +--rw oc-interfaces-jfm-ext:reply?   boolean
      |
      +--rw subinterfaces
      | +--rw subinterface* [index]   |
      |   +--rw index    -> ../config/index
      |   +--rw config
      |   | +--rw index?         uint32
      |   | +--rw description?   string
      |   | +--rw enabled?       boolean
   +--rw network-instances
   +--rw network-instance* [name]
      +--rw name
      +--rw fdb
      | +--rw config
      | | +--rw mac-learning?
      | | +--rw mac-aging-time?
      | | +--rw maximum-entries?
      | | +--rw oc-netinst-jfm-ext:mac-ip-aging-time?
```

The full paths are usable as unique keys within association data 61 defining an associative data structure, which may be a table in a relational or other database, a dictionary, list, map, or other associative data structure. For purposes of description, this associative data structure will be described as a table in a relational database 43. The table has rows that include the path/value pairs. Table 300 includes 4 rows for the 4 property/value pairs of the configuration data for configuration resource 302.

Database 43 may be a relational database, NoSQL database, cloud database, columnar database, object-oriented database, key-value database, other database, or a combination of the above. Database 43 may be cloud-based, off-system, or otherwise remotely accessed by NMS 22, or database 43 may be stored in a storage device of control unit 26, for example.

Management module 28 may iterates (or otherwise process) each of the path/value pairs by comparing each of the generated (flattened-out) path/value pairs for the configuration data for the configuration resource to path/value pairs stored to association data 61. If there is an additional path/value pair to process (YES branch of 508), management module queries association data 61 using the path of the additional path/value pair as a lookup key (510). If an entry for the path does not exist (NO branch of 512), the path/value pair represents a new property/value pair for the configuration resource, and management module 28 adds the path/value pair in association with the application identifier to association data 61 (514).

If an entry for the path already exists (YES branch of 512), management module 28 determines whether the value in the entry matches the value of the path/value pair being processed (516). If so (YES branch of 516), there is no conflict for the corresponding property/value that may have already been added by another application, and management module 28 adds as association of the application identifier to the path/value pair in the existing entry (518). The path/value pair in the existing entry may be associated with multiple different application identifiers. As a result of process 500 performed with respect to multiple configuration requests issued by multiple different application, association data 61 stores unique path/value pairs for configuration resources 65 in a structure that facilitates quick key lookup of unique paths for comparison with new paths generated from an incoming configuration request.

Management module 28 may in some cases add, update, or delete a value of a path/value pair when the value is not a scalar and is instead an array or list of elements. In such cases, management module 28 generates a separate path/value pair for each element in the list of elements in association with the application identifier. For example, for a configuration resource of type AsPathSet having an as-path-set with two elements or "members", management module 28 may generate the following in association data 61 (prefix shown for ease of description):

Prefix: /routing-policy/defined-sets/bgp-defined-sets/as-path-sets/as-path-set
Paths:
config/as-path-set-member[0]=1234
config/as-path-set-member[1]=4321

Each path may also have one or more associated application identifiers (and/or default identifier) for any applications that have configured the corresponding element. Management module 28 may add any new elements to the end of the list. If any application is using any of the elements, the corresponding path/value entry is associated with an application identifier for the application. If no application is using a particular index from the list of elements (e.g. after a deletion), management module 28 may delete the corresponding path/value pair from association data 61. However, management module 28 may not update the index value:

config/as-path-set-member[0]=1234
// deleted
config/as-path-set-member[2]=4321

In addition, the list should not contain any duplicate items—an application can use a subset of elements from the list. Management module 28 may query association data 61 using the list prefix, for example, 'config/as-path-set-member %' and all the list items will be retrieved from association data. Management module 28 may update association information based on the scalar values passed by application in the configuration request and matching them against retrieved rows of path/value pairs. Management module 28 may create new path/value pairs if required and will contain the next highest index. The above techniques may make it possible to have ownership/sharing of individual values in leaflists, as well as ownership/sharing of values in the object lists. Below is an example of storing an object list eg. Subinterfaces belonging to an interface by flattening out in the associative data structure. Here [index=0] and [index=1] are key value pairs that uniquely identify a subinterface instance.

| Prefix: Interfaces/Interface[name=ge-0/0/1] | | | |
|---|---|---|---|
| Config Resource UUID | Path | Value | Tags |
| | subinterfaces/subinterface[index=0]/config/ip_address | 1.1.1.1/24 | App_1 |
| | subinterfaces/subinterface[index=0]/config/description | This sub-interface belongs to App1 | App_1 |
| | subinterfaces/subinterface[index=1]/config/ip_address | 2.2.2.2/24 | App_1, App_2 |
| | subinterfaces/subinterface[index=1]/config/description | This sub-interface is shared by App_1 and App_2 | App_1, App_2 |

The corresponding config data in the configuration request may be as follows:

```
{
    "interfaces": {
        "interface": [
            {
                "name": "ge-0/0/1",
                "subinterfaces": {
                    "subinterface": [
                        {
                            "index": 0,
                            "config": {
                                "index": 0,
                                "ip_address": "1.1.1.1/24",
                                "description": "This sub-interface belongs to App1"
                            }
                        },
                        {
                            "index": 1,
                            "config": {
                                "index": 1,
                                "ip_address": "2.2.2.2/24",
                                "description": "This sub-interface is shared by App_1 and App_2"
                            }
                        }
                    ]
                }
            }
        ]
    }
}
```

If the value in the entry does not match the value of the path/value pair being processed (NO branch of 516), updating the value to the value in the configuration request would overwrite an existing configuration for the corresponding resource configured by another application that may have priority to the resource, at least by virtue of configuring the resource earlier. To avoid upsetting expectations of the other application with respect to network device 24 by inadvertent updating of a configuration parameter used by the other application, management module 28 may return, via interface 30, an error message in response to the configuration request received at 502 to notify the issuing application that the configuration request has failed (520). In some cases, management module 28 may roll back any earlier changes (e.g., at steps 514, 518) made to association data 61 in order that the configuration request would have had no effect on configuration resources 65 or resources 63. Returning an error ends the iteration through the path/value pairs. In some cases, if the value is different (NO branch of 516), but the path/value of the existing entry is associated only with the default identifier and not any other application identifiers, then rather than sending an error, management module 28 may update the value of the existing entry to the new value and may delete the default identifier while adding the application identifier. This reflects an update of the factory default configuration for network device 24 and does not upset expectations of another application. The default identifier is described in more detail below.

Management module 28 iterates processing the path/value pairs at 508 until no further path/value pairs remain (NO branch of 508). At this stage, relevant path/value pairs in association data 61 have been created or updated, and management module 28 therefore updates the corresponding configuration resource in configuration resource 65 to reflect the updated path/value pairs (522). For example, management module 28 may obtain all path/value pairs for the configuration resource and "unflatten" them to generate configuration data for the configuration resource. This may effectively the reverse of the scheme described in step 506 and is illustrated in FIG. 3, whereby management module 28 processes the path and value columns of the entries of association data for the configuration resource, read from table 300, in order to generate configuration resource 302. This includes configuration data for non-scalar values (e.g., lists of elements with their own path/value pairs in association data 61). In some cases, management module 28 may generate the configuration resource by merely creating and/or updating property/value pairs of an existing configuration resource based on new and/or updated path/value pairs, rather than fully re-generating the configuration resource.

The configuration resource generated at step 522 includes the cumulative configuration data created by all applications that have issued configuration requests for that configuration resource. Management module 28 sends configuration data of the configuration resource to network device 22 to modify configuration data 42 for the device and, more specifically, the corresponding resource of resources 63 (524).

For example, the management module 28 may generate configuration data for the configuration resource in structured form, in which case, management module 28 may simply send the configuration data as-is to configuration interface 44 if configuration interface 44 supposed the format (e.g., uses OpenConfig to support JSON, or supports XML, etc.). In some cases, management module 28 may translate the configuration data to a vendor-specific format that meets vendor-specific requirements for configuration data and requests/commands sent to configuration interface 44.

Figure 4:
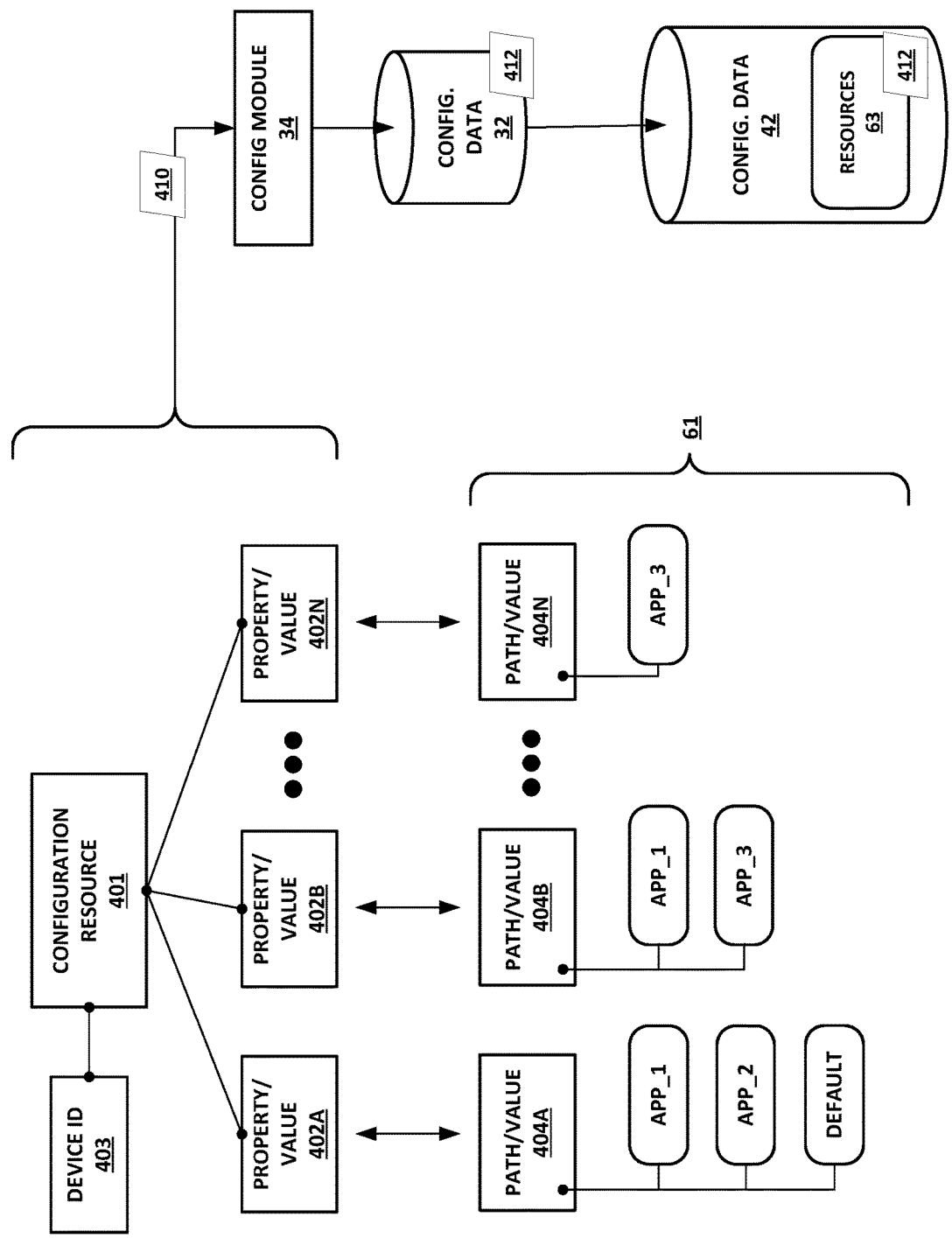
FIG. 4 is a conceptual diagram illustrating examples data structures for managing configuration resources, in accordance with techniques of this disclosure.

FIG. 4 is a conceptual diagram illustrating examples data structures for managing configuration resources, in accordance with techniques of this disclosure. Configuration resource 401 may represent any of configuration resources 65 of NMS 22, for example. Configuration resource 401 is for configuring a corresponding resource on a network device.

Configuration resource 401 may include a device identifier 403 for identifier the network device that is to be configured using configuration resource 401. Configuration resources 402 includes one or more property/value pairs 402A-402N (collectively, "property/value pairs 402"). Each of property/value pairs 402 is configuration data identifying a property of the resource and specifying a value for the property of the resource. Configuration resource 401 may be structured data including property/value pairs 402 and, in some cases, device identifier 403. Configuration resource 302 of FIG. 3 illustrates a configuration resource having structured data including multiple property/value pairs.

NMS 22 uses path/value pairs 404A-404N (collectively, "path/value pairs 404") stored to association data 61 to create, update, delete, and arbitrate access to respective property/value pairs 402A-402N of configuration resource 401. As described above with respect to FIG. 5, NMS 22 may generate or update path/value pair 404A, for instance, using configuration data included in a configuration request or may delete path/value pair 404A based on a delete operation requested in the configuration request for property/value 402A. NMS 22 also associates (or "tags") each path/value pair with one or more application identifiers, or with a "default" identifier or "tag" (as shown in association with path/value pair 404A).

In some cases, NMS 22 may perform device discovery for network device 24 to obtain factory default configuration data. NMS 22 may generate configuration resources 65 for any resources included in the factory default configuration. As part of generating these configuration resources, NMS 22 may also create association data 61 in a manner similar to that of processing configuration requests and associate property/value pairs obtained in the factory default configuration with the default identifier. As shown, path/value 404A is associated with the default identifier, which indicates the corresponding property/value pair 402A may have been a factory default configuration and configuration resource 401 generated from a factory default resource on network device 24.

NMS 22 generates configuration resource 401 from path/value pairs 404 for configuration resource 401. More specifically, NMS 22 may transform each of path/value pairs 404 to its corresponding one of property/value pairs 402 in configuration resource 401 and may, in some cases, conform the generated property/value pairs 402 data to a schema for configuration data for configuration resource 401. That is, the configuration data for configuration resource, here shown by property/value pairs 402, may be structured.

NMS 22 sends property/value pairs 402, in the form of configuration data 410 for configuration resource 401, to network device 22. Configuration module 32 may transform configuration data 410 to commit configuration data 412 and subsequently update configuration data 42 with commit configuration data 412. In this way, NMS 22 and network device 24 update the corresponding one of resources 63 for configuration resource 401. Commit configuration data for a resource may be structured data. Configuration data 306 in FIG. 3 for a resource is shown as an example.

Figure 6:
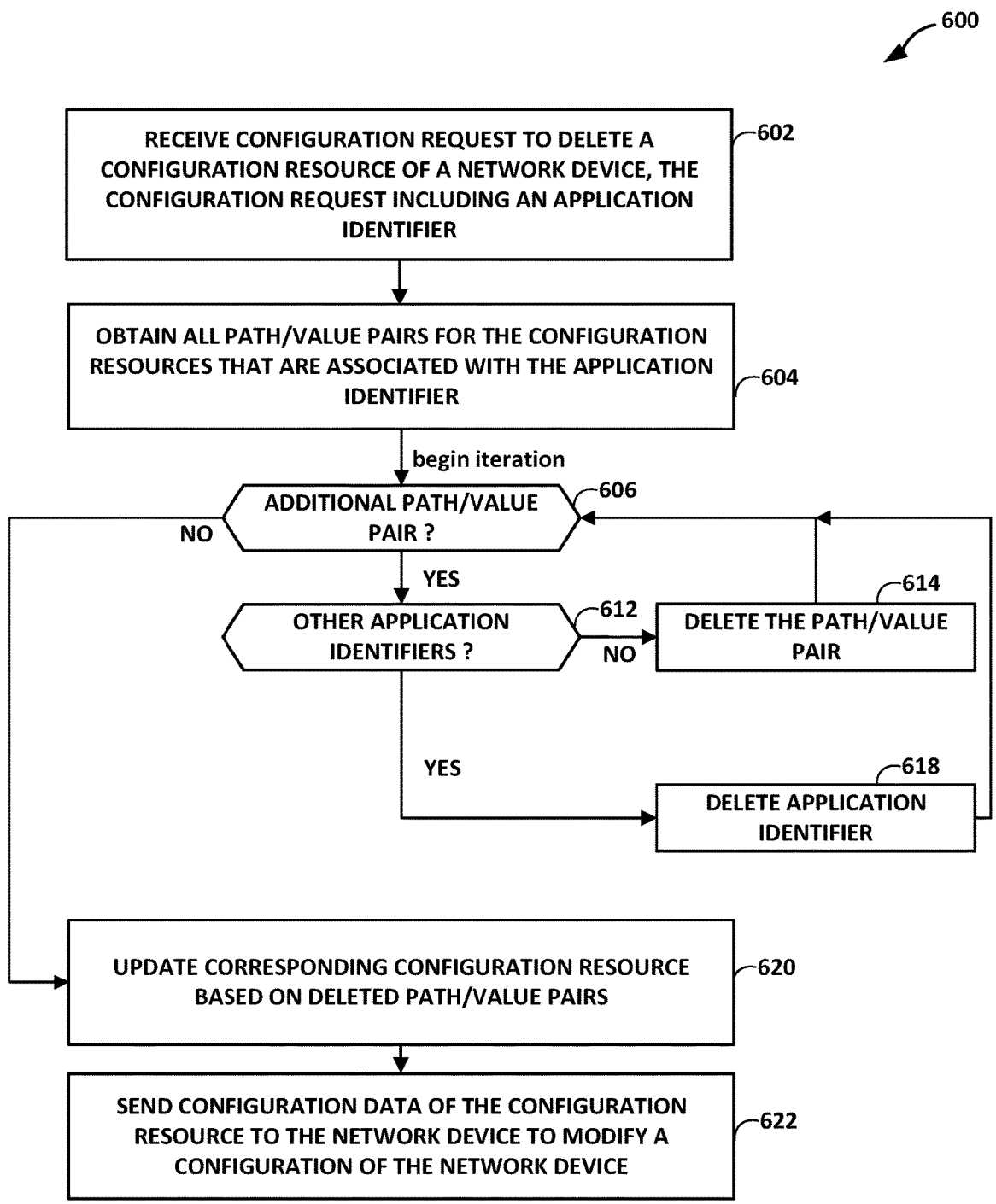
FIG. 6 is a flowchart illustrating an example process performed by a network management system to process a configuration request, in accordance with techniques of this disclosure.

FIG. 6 is a flowchart illustrating an example process 600 performed by a network management system to process a configuration request, in accordance with techniques of this disclosure. Process 500 is described with respect to NMS 22 of FIG. 2, configuring network device 24, but may performed by other NMSes or other systems (e.g., EMSes, DMSes) to configure other examples of network devices described herein.

Management module 22 receives, via interface 30, a configuration request to delete a configuration resource of configuration resources 65, the configuration request including an indication of an application that issued the configuration request (602). The indication may be an application identifier for the application. An example of data included in a configuration request to delete a configuration resource is as follows:
Application-ID: App_2
Device-ID: <unique-device-identifier>
Prefix: Interfaces/Interface[name=ge-0/0/1]

As in earlier examples, Prefix may be understood as a resource name or resource identifier that will uniquely identify the configuration resource in the context of the device identified by Device-ID. Application-ID identifies the application that issued the configuration request to delete the configuration resource.

Management module 22 may query association data 61 to obtain all path/value pairs (along with any associated identifiers) for the configuration resource that are associated with an application identifier for the application (604). Management module 22 may filter all path/value pairs for the configuration resource by application identifier in the query or against the result set for the query, for example.

Management module 28 iterates processing (or otherwise processes) the path/value pairs meeting the criteria (606). If there is another path/value pair to process (YES branch of 606), management module 28 determines whether the path/value pair is associated with any additional application identifiers (612). If not (NO branch of 612), the configuration is not needed and management module 28 deletes the path/value pair from association data 61 (614). If there is another application identifier associated (YES branch of 612), then the configuration is still needed by at least one other application, and therefore management module 28 deletes, in the association data 61 for the path/value pair, only the application identifier for the application that issued the configuration request received at 602 (618). In effect, this remove the tag for that path/value pair.

Management module 28 iterates processing the path/value pairs at 606 until no further path/value pairs remain (NO branch of 606). At this stage, relevant path/value pairs in association data 61 have been deleted, and management module 28 therefore updates the corresponding configuration resource in configuration resource 65 to reflect the updated path/value pairs (620). For example, management module 28 may obtain all path/value pairs for the configuration resource and "unflatten" them to generate configuration data for the configuration resource. This may effectively the reverse of the scheme described in step 506 and is illustrated in FIG. 3, whereby management module 28 processes the path and value columns of the entries of association data for the configuration resource, read from table 300, in order to generate configuration resource 302. This includes configuration data for non-scalar values (e.g. lists of elements with their own path/value pairs in association data 61). In some cases, management module 28 may generate the configuration resource by merely creating and/or updating property/value pairs of an existing configuration resource based on new and/or updated path/value pairs, rather than fully re-generating the configuration resource.

The configuration resource generated at step 620 includes the cumulative configuration data created by all applications that have issued configuration requests for that configuration resource. Management module 28 sends configuration data of the configuration resource to network device 22 to modify configuration data 42 for the device and, more specifically, the corresponding resource of resources 63 (622).

For example, the management module 28 may generate configuration data for the configuration resource in structured form, in which case, management module 28 may simply send the configuration data as-is to configuration interface 44 if configuration interface 44 supposed the format (e.g., uses OpenConfig to support JSON, or supports XML, etc.). In some cases, management module 28 may translate the configuration data to a vendor-specific format that meets vendor-specific requirements for configuration data and requests/commands sent to configuration interface 44.

Using a relational database to store path/value pairs with paths as unique keys improves searching the existing paths in the relational database, for queries with different types of match clauses can be executing against relational database. In some examples, use of a relational database and a tagging feature may make it efficient to add, update and remove the path/value and application identifier associations. Still further, the techniques may improve efficiency of determining whether a particular property/value pair is no longer used by any application—absence of any associated application identifier for the corresponding property/value pair means the property/value pair can be removed from the network device configuration. The techniques may permit multiple applications to independently update different path/value pairs for same configuration resource (and corresponding resource on the network device). The techniques may also permit an application to stop using a configuration resource, which allows the NMS 22 to remove the configuration so long as the configuration resource is exclusive to that application. The techniques may also permit the NMS 22 and network device 24 to retain the factory default configuration, at least for so long as no application updates it. The techniques may permit multiple applications to run on top of NMS 22 and provide flexibility in defining and using a shared configuration resource by the multiple applications.

In some examples, NMS 22 may use configuration resources 65 and other techniques described herein to perform disaster recovery. For instance, NMS 22 may encode data indicating ownership/association of path/value pairs on network device 24. NMS 22 may then subsequently obtain and "regenerate" configuration resources 65 from network device 24 and also populate association data 61 with the path/value pairs and application associations. This may be particularly useful for a situation in which NMS 22 fails due, for instance, to a site disaster where NMS 22 is hosted to corruption of configuration data 32 or database 43.

For the events such as database corruption or site disaster, association data 61 for a configuration resource can be encoded into a structure similar to one below, where the path and the list of associated applications can be maintained:

```
{
    "config/name": "Default, App_1, App_2",
    "config/mtu": "App_1, App_2",
    "config/description": "App_1",
    "gratuitous-arp/config/reply": "App_1"
}
```

NMS 22 may push this structured representation of the association data 61 onto network device 24, for each configuration resource. NMS 22 may cause this data to be stored as a comment/annotation within configuration data 42, as in the below example:

```
<rpc>
    <edit-config>
        <target>
            <candidate/>
        </target>
        <config>
            <configuration>
                <interfaces>
                    <interface>
                        <name>ge-0/0/1</name>
                        <product:comment>{"config/name":"Default,
App_1, App_2","config/mtu":"App_1, App_2","config/
description":"App_1 ","gratuitous-arp/config/reply":"App_2"}
</comment>
                        <description>Description for interface ge-0/0/4
</description>
                        <mtu>1200</mtu>
                        <gratuitous-arp-reply/>
                    </interface>
                </interfaces>
            </configuration>
        </config>
    </edit-config>
</rpc>
```

With the above embedded comments, NMS 22 can obtain and rebuild configuration resources as well as the association data 61 for each path/value pair by processing the comment. For example, NMS 22 may issue the following RPC to network device 24 to obtain the configuration along with the ownership information from device for interface 'ge-0/0/1'.

```
<rpc
    xmlns:product="http://xml.site.net/ ">
    <get-config>
        <source>
```

-continued

```
            <running/>
        </source>
        <filter type="subtree">
            <configuration>
                <interfaces>
                    <interface>
                        <name>ge-0/0/1 </name>
                    </interface>
                </interfaces>
            </configuration>
        </filter>
    </get-config>
</rpc>
```

NMS 22 receives reply:

```
<nc:rpc-reply
    xmlns:nc="urn:ietf: params:xml:ns:netconf:base:1.0"
    xmlns:product="http://xml.site.net/ ">
    <nc:data type="subtree">
        <configuration>
            <interfaces>
                <interface>
                    <name>ge-0/0/4</name>
                    <product:comment>/* {"config/name":"Default,
App_1, App_2","config/mtu":"App_1, App_2","config/description":
"App_1 ","gratuitous-arp/config/reply":"App_2"}*/</product:
comment>
                    <description>Description for interface ge-0/0/4
</description>
                    <mtu>1200</mtu>
                    <gratuitous-arp-reply/>
                </interface>
            </interfaces>
        </configuration>
    </nc:data>
</nc:rpc-reply>
```

NMS 22 may convert the comment into JSON, for example, and populate association data 61 for the configuration resource accordingly.

In some examples, applications are expected to maintain all configuration needed for a configuration resource. NMS 22 may, however, provide a Get option to retrieve a configuration resource. The Get request will include an application identifier, and NMS 22 may generate configuration data for the configuration resource, optionally formatted, by obtaining the path/value pairs associated with the application identifier in association data 61.

In some examples that use a gNMI-based interface for interface 30, then after an initial create of a configuration resource, subsequent updates or deletions of property/value pairs do not require sending a full payload. Applications can send only the gNMI path/value pairs in the SetRequest that need to be updated or deleted. The gNMI specification supports an extension proto that can be sent in a SetRequest. The application identifier can be populated in this extension proto.

The techniques may provide one or more technical advantages that are not possessed by server-side apply. For example, the techniques may apply across domains. For example, they do not require Kubernetes or any particular orchestration platform. NMS 22 uses a different mechanism for storing and managing associations of property/value pairs and applications, i.e., association data 61. The techniques may more efficiently store data versus server-side apply, since Configuration Resource Definitions (CRD) are stored as an uninterpreted block in etcd.

The techniques may have advantages over server-side apply with respect to conflicts: Once a configuration resource is flattened, simple relational database queries can be performed to see if the value of a path used by another application is being modified. By contrast, server-side apply goes through the managed field of each field manager to identify conflicts. That is, in Kubernetes server-side apply, changes to an object's fields are tracked through a "field management" mechanism. When a field's value changes, ownership moves from its current manager to the manager making the change.

The techniques use association data 61 that is less verbose compared to server-side apply, which may make it easier to serialize the association data 61 for configuration resources 65 to network devices or backup resources, as well as to deserialize such backups and regenerate configuration resources 65. The techniques may provide a more consistent approach for delete compared to server-side apply, i.e., with an explicit delete request instead of sending empty configuration. In the described techniques, the delete operation may be more efficient than server-side apply, for only the application identifiers need to be removed for the application that issued the request. Moreover, deleting a path/value pair from a configuration resource is also efficient: the presence of no associated application identifier for the path/value pair prompts removal.

As a still further advantage, NMS 22 may in some examples use a relational database for various storage requirements. There are obvious benefits like indexing, faster queries, etc., using relational databases. For an NMS to leverage the server-side apply of Kubernetes, the NMS would have to use an additional storage system in the form of etcd and also duplicate information into etcd. Kubernetes config-maps and CRDs serve the purpose of storing configuration information for the application but not business data, and relational database are built to handle large volumes of business data. Also, in server-side apply, the association with applications is maintained based on the actor who manages keys (i.e. the keys are owned and shared). By contrast, NMS 22 maintains these associations additionally based on the values of the keys/paths (i.e. the values are shared between the applications). As a result, it is possible to have ownership/sharing of values in the leaflist, and it is possible to have ownership/sharing of values in the object lists.

Figure 7:
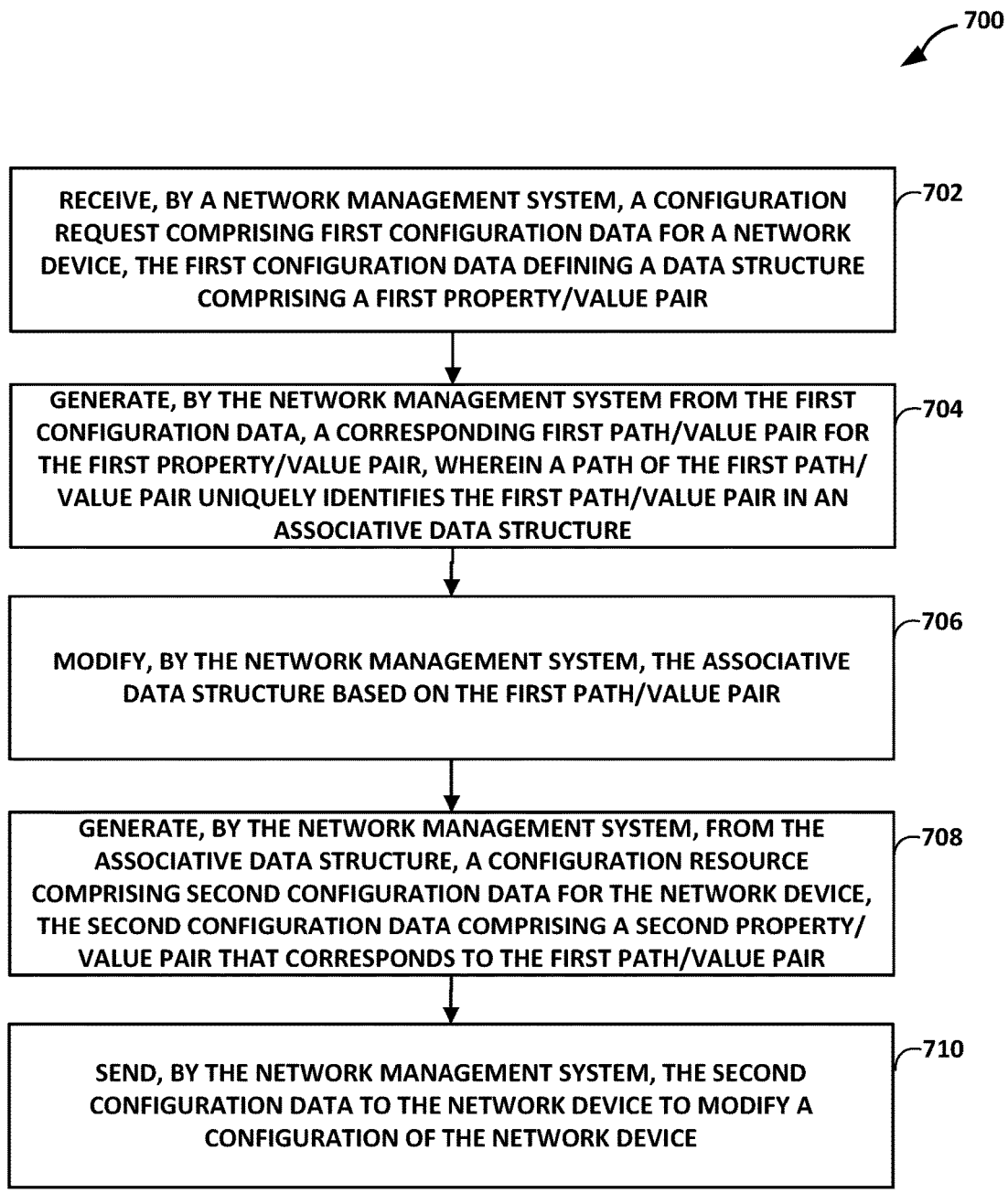
FIG. 7 is a flowchart illustrating an example operation of a network management system, in accordance with techniques of this disclosure.

FIG. 7 is a flowchart illustrating an example operation of a network management system 10, in accordance with one or more techniques of this disclosure. As seen in the example of FIG. 7, network management system 10 initially may receive a configuration request comprising first configuration data for a network device 14A, the first configuration data defining a data structure comprising a first property/value pair (702). Next, network management system 10 may generate, from the first configuration data, a corresponding first path/value pair for the first property/value pair, wherein a path of the first path/value pair uniquely identifies the first path/value pair in an associative data structure (704). Next, network management system 10 may modify the associative data structure based on the first path/value pair (706). Next, network management system 10 may generate from the associative data structure, a configuration resource comprising second configuration data for network device 14A, the second configuration data comprising a second property/value pair that corresponds to the first path/value pair (708). Next, network management system 10 may send the second configuration data to network device 14A to modify a configuration of network device 14A (710).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A network management system comprising:
a control unit comprising processing circuitry coupled to a memory, wherein the control unit is configured to:
receive a configuration request comprising first configuration data for a network device, the first configuration data defining a data structure comprising a first property/value pair;
generate, from the first configuration data, a corresponding first path/value pair for the first property/value pair, wherein a path of the first path/value pair uniquely identifies the first path/value pair in an associative data structure;
modify the associative data structure based on the first path/value pair;
generate, from the associative data structure, a configuration resource comprising second configuration data for the network device, the second configuration data comprising a second property/value pair that corresponds to the first path/value pair; and
send the second configuration data to the network device to modify a configuration of the network device.

2. The network management system of claim 1,
wherein the configuration request comprises an application identifier for an application that issued the configuration request, and
wherein to modify the associative data structure to include the first path/value pair, the control unit is configured to:
modify the associative data structure to associate the first path/value pair with the application identifier.

3. The network management system of claim 2,
wherein the configuration request comprises a first configuration request, and
wherein the control unit is configured to:
receive a second configuration request to delete configuration data, the second configuration request comprising the application identifier for the application;
obtain, from the associative data structure based on the application identifier, an obtained path/value pair that is associated with the application identifier; and
in response to determining the obtained path/value pair is also associated with an application identifier for a different application, deleting the association of the application identifier with the obtained path/value pair.

4. The network management system of claim 2,
wherein the configuration request comprises a first configuration request, and
wherein the control unit is configured to:
receive a second configuration request to delete configuration data, the second configuration request comprising the application identifier for the application;
obtain, from the associative data structure based on the application identifier, an obtained path/value pair that is associated with the application identifier;
in response to determining the obtained path/value pair is not associated with an application identifier for any other application, deleting the obtained path/value pair from the associative data structure;
generate, from the associative data structure with the obtained path/value pair deleted, an updated configuration resource comprising third configuration data for the network device; and
send the third configuration data to the network device to modify the configuration of the network device.

5. The network management system of claim 2,
wherein the application comprises a first application,
wherein the configuration request comprises a first configuration request, and
wherein the control unit is configured to:
receive a second configuration request to comprising third configuration data for the network device and an application identifier for a different, second application that issued the second configuration request, the third configuration data defining a data structure comprising a second property/value pair;
generate, from the third configuration data, a corresponding second path/value pair for the second property/value pair, wherein a path of the second path/value pair uniquely identifies the second path/value pair in the associative data structure; and
in response to determining, by querying the associative data structure, that the first path/value pair included in the associative data structure has a same path and a same value as the second path/value pair, modify the associative data structure to associate the first path/value pair with the application identifier for the second application.

6. The network management system of claim 2,
wherein the application comprises a first application,
wherein the configuration request comprises a first configuration request, and
wherein the control unit is configured to:
receive a second configuration request to comprising third configuration data for the network device and an application identifier for a different, second application that issued the second configuration request, the third configuration data defining a data structure comprising a second property/value pair;
generate, from the third configuration data, a corresponding second path/value pair for the second property/value pair, wherein a path of the second path/value pair uniquely identifies the second path/value pair in the associative data structure; and
in response to determining, by querying the associative data structure, that the first path/value pair included in the associative data structure has a same path and a different value as the second path/value pair, output an indication of an error.

7. The network management system of claim 1, wherein to modify the associative data structure to include the first path/value pair, the control unit is configured to:
modify, in response to determining the associative data structure does not store the first path/value pair, the associative data structure to include the first path/value pair.

8. The network management system of claim 1, wherein to generate the corresponding first path/value pair for the first property/value pair the control unit is configured to:
process the data structure to obtain a prefix string for the first property/value pair;
form the path of the first path/value pair from the prefix string and a property of the first property/value pair; and
form the value of the first path/value pair from the value of the first property/value pair.

9. The network management system of claim 1, wherein to generate the corresponding first path/value pair for the first property/value pair the control unit is configured to:
process the data structure to use a schema for generic remote procedure call network management interface (gNMI) paths to form the path of the first path/value pair; and
form the value of the first path/value pair from the value of the first property/value pair.

10. The network management system of claim 1, wherein to generate the configuration resource comprising second configuration data for the network device, the control unit is configured to:
obtain the first path/value pair from the associative data structure;
generate, from the first path/value pair, the second property/value pair; and
generate the second configuration data of the configuration resource to include the second property/value pair.

11. The network management system of claim 1,
wherein the configuration request comprises an application identifier for an application that issued the configuration request, and
wherein the control unit is configured to:
embed, in the second configuration data, a representation of the first path/value pair and the application identifier;

obtain, from the network device, after sending the second configuration data to the network device, the second configuration data; and generate the associative data structure to include an association of the first path/value pair and the application identifier.

12. The network management system of claim 1, wherein the second configuration data of the configuration resource is formatted according to one of Javascript Object Notation or eXtensible Markup Language.

13. The network management system of claim 1, wherein the second configuration data configures, in the network device, a resource that corresponds to the configuration resource, wherein a type of the resource comprises one of an interface, a routing instance, a network instance, or a protocol.

14. A method comprising:

receiving, by a network management system, a configuration request comprising first configuration data for a network device, the first configuration data defining a data structure comprising a first property/value pair;

generating, by the network management system from the first configuration data, a corresponding first path/value pair for the first property/value pair, wherein a path of the first path/value pair uniquely identifies the first path/value pair in an associative data structure;

modifying, by the network management system, the associative data structure based on the first path/value pair;

generating, by the network management system, from the associative data structure, a configuration resource comprising second configuration data for the network device, the second configuration data comprising a second property/value pair that corresponds to the first path/value pair; and sending, by the network management system, the second configuration data to the network device to modify a configuration of the network device.

15. The method of claim 14, wherein the configuration request comprises an application identifier for an application that issued the configuration request, and wherein modifying the associative data structure to include the first path/value pair comprises modifying the associative data structure to associate the first path/value pair with the application identifier.

16. The method of claim 15, wherein the configuration request comprises a first configuration request, the method further comprising:

receiving, by the network management system, a second configuration request to delete configuration data, the second configuration request comprising the application identifier for the application;

obtaining, by the network management system, from the associative data structure based on the application identifier, an obtained path/value pair that is associated with the application identifier; and in response to determining the obtained path/value pair is also associated with an application identifier for a different application, deleting the association of the application identifier with the obtained path/value pair.

17. The method of claim 14, wherein modifying the associative data structure to include the first path/value pair comprises modifying, in response to determining the associative data structure does not store the first path/value pair, the associative data structure to include the first path/value pair.

18. The method of claim 14, wherein generating the corresponding first path/value pair for the first property/value pair comprises:

processing the data structure to obtain a prefix string for the first property/value pair;

forming the path of the first path/value pair from the prefix string and a property of the first property/value pair; and forming the value of the first path/value pair from the value of the first property/value pair.

19. The method of claim 14, wherein the second configuration data configures, in the network device, a resource that corresponds to the configuration resource, wherein a type of the resource comprises one of an interface, a routing instance, a network instance, or a protocol.

20. A non-transitory computer-readable medium comprising instructions for causing processing circuitry of a network management system to perform operations comprising:

receiving a configuration request comprising first configuration data for a network device, the first configuration data defining a data structure comprising a first property/value pair;

generating, from the first configuration data, a corresponding first path/value pair for the first property/value pair, wherein a path of the first path/value pair uniquely identifies the first path/value pair in an associative data structure;

modifying the associative data structure based on the first path/value pair;

generating, from the associative data structure, a configuration resource comprising second configuration data for the network device, the second configuration data comprising a second property/value pair that corresponds to the first path/value pair; and sending the second configuration data to the network device to modify a configuration of the network device.

* * * * *